United States Patent [19]

Inoue

[11] Patent Number: 4,506,133
[45] Date of Patent: Mar. 19, 1985

[54] DYNAMIC BALANCING MACHINE USING EDM

[75] Inventor: Kiyoshi Inoue, Tokyo, Japan

[73] Assignee: Inoue-Japax Research Incorporated, Yokohama, Japan

[21] Appl. No.: 445,104

[22] Filed: Nov. 29, 1982

[30] Foreign Application Priority Data

Nov. 30, 1981 [JP] Japan .................. 56-190633

[51] Int. Cl.³ .......................... B23P 1/08; G01M 1/38
[52] U.S. Cl. ..................... 219/69 C; 73/468; 204/129.2; 219/69 R; 219/69 P
[58] Field of Search ............... 219/69 C, 69 M, 69 R, 219/68, 121 EB, 121 EF, 121 EM, 121 EH, 121 EJ, 121 L, 121 LM, 121 LG, 121 LH, 121 LJ, 69 V; 23/66, 462, 468; 204/129.1, 129.2

[56] References Cited

U.S. PATENT DOCUMENTS

| 2,322,561 | 6/1943 | Blevins | 219/69 M |
| 2,346,975 | 4/1944 | Laboulais | 219/69 M |
| 3,482,075 | 12/1969 | Wilde | 219/121 LH |
| 4,028,524 | 6/1977 | Moll et al. | 73/462 |
| 4,060,707 | 11/1977 | Olsson et al. | 73/462 |
| 4,170,528 | 10/1979 | Mathews | 204/129.2 |
| 4,419,894 | 12/1983 | Matumoto | 73/462 |

FOREIGN PATENT DOCUMENTS

| 2335542 | 1/1975 | Fed. Rep. of Germany | 73/462 |
| 54-119194 | 9/1979 | Japan | 219/69 R |
| 54-150183 | 11/1979 | Japan | 73/462 |
| 958047 | 7/1961 | United Kingdom | 219/69 C |
| 1268482 | 3/1972 | United Kingdom | |
| 1463512 | 2/1977 | United Kingdom | |
| 1538337 | 1/1979 | United Kingdom | |
| 2053514A | 2/1981 | United Kingdom | |
| 661351 | 5/1979 | U.S.S.R. | 73/468 |

*Primary Examiner*—Roy N. Envall, Jr.
*Assistant Examiner*—Geoffrey S. Evans
*Attorney, Agent, or Firm*—Karl F. Ross; Herbert Dubno

[57] ABSTRACT

A dynamic balancing machine having a full-automatic reforming unit is disclosed. The machine includes a pair of oscillatory bearing units for resiliently supporting a workpiece rotatably about a horizontal axis. Pickups are provided to sense the oscillations of the rotating workpiece about the axis. A computing unit responds to oscillation signals to determine therefrom and from signals representing the rotation of the workpiece the amounts and positions of local unbalance of the workpiece. For reforming operation, a fluid-actuated piston/cylinder arrangement is used to fix the axis of rotation of the workpiece in alignment with the horizontal axis to enable the workpiece to rotate without oscillations. The reforming unit comprises an EDM arrangement and control circuit responsive to the computing unit for controlling parameters of machining by an EDM tool electrode located in machining relationship with each of the regions of the computed positions so as to electroerosively remove from each region the computed amount of material and reform the workpiece.

2 Claims, 1 Drawing Figure

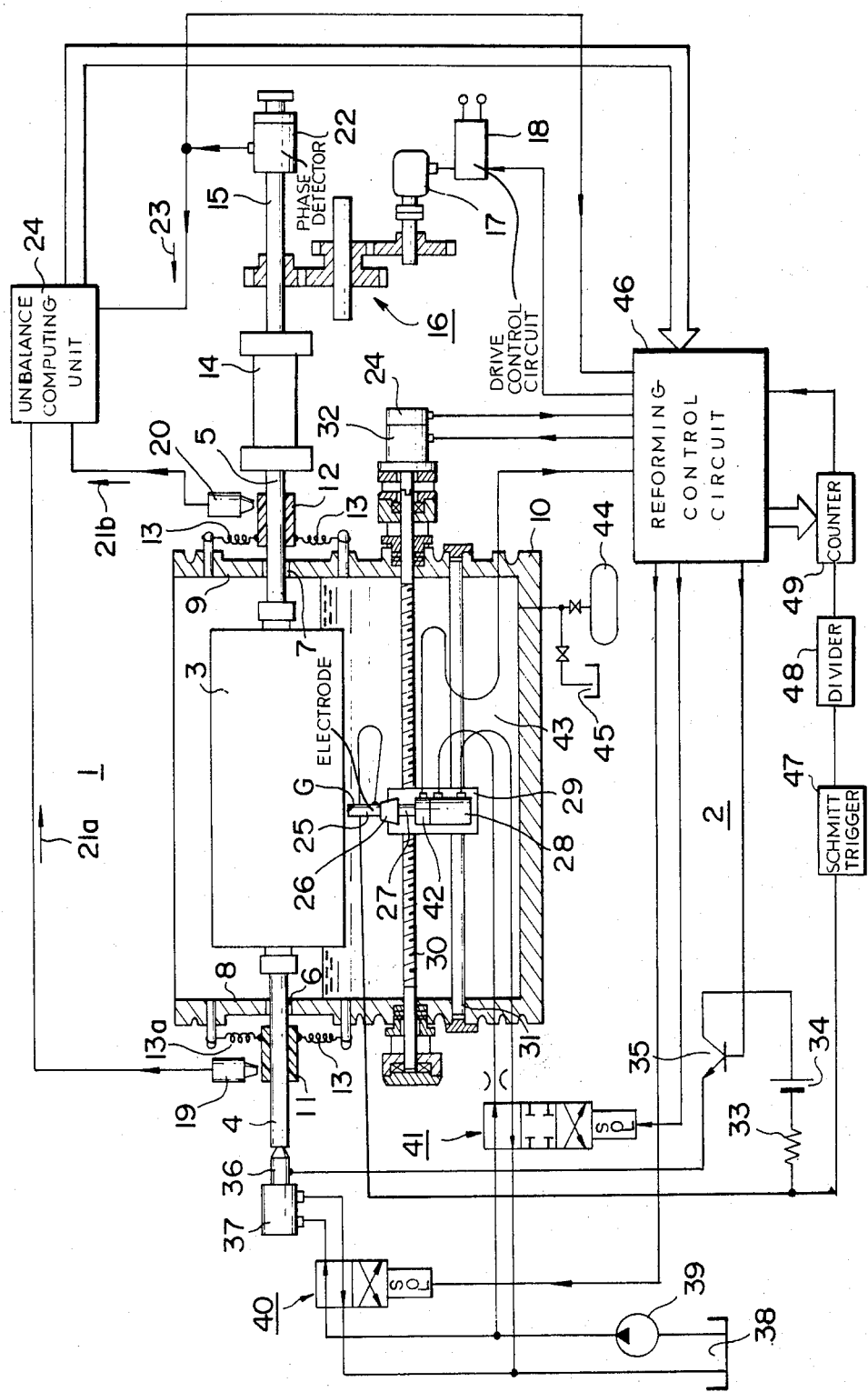

DYNAMIC BALANCING MACHINE USING EDM

FIELD OF THE INVENTION

The present invention relates to dynamic balancing machines and, more particularly, to a dynamic balancing machine incorporating a full automatic reforming unit for universal utility.

BACKGROUND OF THE INVENTION

A dynamic balancing machine has been known and widely utilized in which a workpiece to be tested is supported between and journaled with a pair of resiliently supported bearing units and is rotated at a high rate of rotation. Means is provided to analyze oscillations caused in the bearing units, thereby computing amounts of local unbalance or deviation and their respective angular positions. These amounts and positions are commonly indicated by a visual display.

A dynamic balancing machine incorporating a full- or semi-automatic reforming unit has also been proposed. Such machines have all been designed, however, only for limited purposes or exclusive use of limited or peculiar workpieces. Furthermore, these prior machines have commonly made use of a mechanical cutter or drill for reforming the workpiece. As a result, there have been severe limitations in locations and geometries which can be reformed as well as in reformable extents, and difficulties to achieve a finish without leaving discontinuity of reformation. These severe conditions have made the machine unduly complex and expensive, and mostly unpractical.

OBJECTS OF THE INVENTION

The present invention seeks to provide an improved dynamic balancing machine with universal utility, the machine having novel, full-automatic reforming means integrated with an unbalance testing mechanism and capable of overcoming the difficulties which have been encountered heretofore.

SUMMARY OF THE INVENTION

In accordance with the present invention there is provided with a dynamic balancing machine which comprises: a pair of oscillatory bearing means for resiliently supporting a workpiece rotatably about a horizontal axis; means for rotating the workpiece about the said axis; means responsive to the rotation and oscillations of the rotating workpiece about the said axis for computing amounts and positions of local unbalance of the workpiece; means for fixing the axis of rotation of the workpiece in alignment with the horizontal axis to enable the workpiece to rotate without oscillations; reforming means including non-mechanical tool means positionable in machining relationship with respective regions of the computed positions for reforming the workpiece; drive means responsive to the computing means for displacing the tool means to successively locate the same in machining relationship with the said regions of the workpiece while in rotation by the rotating means about the said axis; and control means responsive to the computing means for controlling parameters of machining by the said tool means located in machining relationship with each of said regions so as to compensatorily eliminate a respective one of said computed amounts, thereby reforming the workpiece.

BRIEF DESCRIPTION

The sole FIGURE in the drawing is a schematic diagram illustrating an embodiment of the present invention.

SPECIFIC DESCRIPTION OF THE DRAWING

Referring now to the sole FIGURE in the drawing, a dynamic balancing machine 1 embodying the present invention will now be described which incorporates an automatic reforming unit 2 utilizing electrical discharge machining.

In the machine 1, a cylindrical workpiece 3 to be tested and reformed is carried horizontally by a pair of coaxial supporting shafts 4 and 5 secured thereto so as to be coaxial therewith. The shafts 4 and 5 extend horizontally passing freely through a pair of openings 6 and 7 formed in opposed side walls 8 and 9 of a housing 10 constituting the frame of the machine 1. Further, the shafts 4 and 5 are journaled with oscillatory bearing units 11 and 12, respectively which are resiliently supported by springs 13.

The shaft 5 is coupled via a universal joint 14 with a further coaxial shaft 15. The shaft 15 is drivingly coupled via a gear transmission 16 with the output shaft of an electric motor 17 which is energized by a drive control circuit 18. The motor 17 is driven to rotate the workpiece 3 and the shafts 4 and 5 at a high rate of rotation about their horizontal axes.

If there is an unbalance in the weight distribution of the workpiece 3, i.e. a deviation in geometry of the workpiece 3 from a desired perfect cylinder, the bearing units 11 and 12 are caused to oscillate. These oscillations are detected by pickups 19 and 20 disposed in the vicinity of the bearing units 11 and 12, respectively, and are thereby converted into corresponding electrical signals. An instantaneous angular phase of rotation of the workpiece 3 is sensed by a phase detector 22 operably associated with the shaft 15 and is thereby converted into a corresponding electrical signal 23. The signals 21a and 21b and the signal 23 are fed into an unbalance-computing unit 24 which is programmed to determine from these signals which represent the magnitudes of local unbalance and their respective angular positions, amounts of metal to be added to or removed from the workpiece 3 by the reforming unit 2 and their respective coordinate positions.

Metal addition for reforming the workpiece 3 may utilize electrolytic deposition, spark deposition, or laser-activated electrolytic or chemical deposition. Metal removal for reforming the workpiece 3 may utilize electrical or electroerosive machining. The reforming unit 2 shown is designed to locally remove metal from the workpiece 3 by electrical discharge machining (EDM).

The reforming unit 2 thus makes use of an EDM tool electrode 25 which is here secured via a chuck 26 to a piston 27 adjustably projecting from a cylinder 28 which is securely mounted on a carriage 29. The carriage 29 is carried on a lead screw 30 and a guide bar 31 and is adapted to be driven by the lead screw 30 to move in horizontal directions. The lead screw 30 is adapted to be driven by a stepping motor 32.

The tool electrode 25 is electrically connected via a resistor 33 to the negative terminal of a DC source 34 whose positive terminal is connected via a power switch 35 to an electrically conductive piston 36 which is in abutting contact with one end face of the shaft 4.

The shaft 4 is electrically conductive and electrically connected to the workpiece 3. It will be seen that the DC source 34, the power switch 35 and the resistor 33 constitute an EDM power supply for applying a succession of EDM pulses between the tool electrode 25 and the workpiece 3.

The piston 36 projecting from a cylinder 37 is kept retracted while the workpiece 4 is being tested. The cylinder 37 is actuated by a pressure fluid fed from a fluid reservoir 38 by a pump 39. A two-position and four-port switching valve unit 40 is provided between the fluid reservoir 38 and the cylinder 37 and is adapted to be controlled to retract into and advance from the cylinder 37 the piston 36. The piston 36 is advanced to come into abutting contact with the shaft 4 for the operation of reforming the workpiece 3, thereby on one hand establishing the closed electrical circuit connecting the workpiece 3 with the EDM power supply 33, 34, 35 and the tool electrode 25 and on the other hand fixing the axis of rotation for the workpiece 3 so that the latter rotates without oscillation.

The cylinder 28 for positioning the tool electrode 25 is also actuated by the pressure fluid fed from the reservoir 38 by the pump 39. A three-position four-port switching valve unit 41 is provided between the cylinder 28 and the reservoir 38 and is adapted to be controlled to control the vertical position of the piston 27 and hence of the tool electrode 25. The vertical position of the piston 27 and hence of the tool electrode 25 is sensed by an encoder 42.

In the reforming operation, an EDM fluid 43 is introduced from a supply 44 into the housing or receptacle 10 to dip the workpiece 3 partially therein. A sump 45 is also provided to receive the spent EDM fluid 43 from the housing 10.

The tool electrode 25 may be tubular to provide an internal bore open towards the workpiece 3. The EDM fluid supply 44 may then be connected directly with the bore to supply a pressurized stream of the EDM fluid directly onto the workpiece 3.

The reforming unit 2 is also provided with a reforming control circuit 46 which is responsive to an output signal of the unbalance-computing unit 24 to act on the motor 17, the motor 32, the valve unit 41 and the power switch 35.

The reforming control unit 46 has data for the shape and dimensions of the workpiece 3 prestored therein. These data are processed in the reforming control unit 46 to produce individual control signals to be applied to the motor 17, the motor 32 and the valve 41. Thus, the motor 17 is driven by the drive circuit 18 furnished with a corresponding signal to slowly rotate the workpiece until each given angular position thereof is established. The stepping motor 32 is driven to rotate the feed screw 30 until the axis of the tool electrode 25 carried thereon reaches each given horizontal position thereof. The valve unit 41 is controlled to actuate the piston 27 in the cylinder 28 until the tool electrode 25 reaches each given vertical position for machining the workpiece 3 across an EDM gap G.

The surface of the workpiece 3 to be reformed is previously divided into a multiplicity of uniform sections each individually of a given small area comparable with the area of the active end face of the tool electrode 25.

Each individual amount of EDM stock removal indicated by the unbalance computing unit 24 for a given such section is represented by the produce of the stock removal per single discharge and the number of discharges, the stock removal per single discharge being determined by the peak current and duration of each discharge pulse which can be fixed so that only the number of discharge pulses may be a variable parameter.

The positions of all of those divided sections which require reforming are, as noted previously, identified by the unbalance computing unit 24, together with the amount of reforming required for each such position. The position signals are transmitted from the unit 24 into the reforming control circuit 46 and there converted into drive control signals for the motor 17 and the motor 32 so that the tool electrode 25 is successively brought into EDM relationship with these suctions on the workpiece 3.

In each stage in which the tool electrode 25 is spacedly juxtaposed with a given section, the control unit 46 is operated to allow the power switch 35 in the EDM power supply to be intermittently turned on to effect a succession of metal removal electrical discharges across the tool electrode 25 and that section of the workpiece 3 while permitting the tool electrode 25 to be continuingly advanced through the valve unit 41 and the cylinder 28. Then, the number of electrical discharges effected across the machining gap G by the EDM power supply 33, 34, 35 is counted. To this end, a Schmitt-trigger circuit 47 is provided in circuit with the EDM gap G to detect successive electrical discharges. Corresponding output signals of the Schmitt-trigger circuit 47 is fed via a divider 48 into a preset counter 49 having variable count levels. The reforming control circuit 46 acts on the preset counter 49 to establish its count level at a value corresponding to the metal removal established by the unbalance computing unit 24 for the position of the given section on the workpiece 3. When the number of electrical discharges reaches this established value of the counter 49, the control circuit 46 deactuates the power switch 35 in the EDM power supply and at the same time halts the axial advance feed of the tool electrode 25 which has continued. In this manner, all portions of unbalance can be eliminated.

What is claimed is:

1. A dynamic balancing machine, comprising:
    a pair of oscillatory bearing means for resiliently supporting a conductive workpiece rotatably about a horizontal axis;
    means for rotating said conductive workpiece about said horizontal axis;
    computing means responsive to the rotation and oscillations of the rotating conductive workpiece about said horizontal axis for computing amounts and positions of local unbalance of the workpiece;
    means for fixing the axis of rotation of said conductive workpiece in alignment with said horizontal axis to enable said conductive workpiece to rotate without oscillations;
    non-mechanical tool means positionable in machining relationship with respective regions of said computed positions for reforming said conductive workpiece;
    drive means responsive to said computing means for displacing said tool means to successively locate the same in machining relationship with said regions of the conductive workpiece while in rotation about said aligned axis; and
    control means responsive to said computed means for controlling parameters of machining by said tool means located in machining relationship with each of said regions so as to compensatorily eliminate a respective one of said computed amounts, thereby reforming said conductive workpiece, said tool means comprising an electroerosive machining electrode, means for supplying dielectric machining fluid into a gap between said machining electrode and said conductive workpiece, and an electroerosive machining power supply for passing an electroerosive machining current in the form of discrete discharges of fixed duration and level between said machining electrode and said conductive workpiece to electroerosively remove material from the conductive workpiece across said gap in the presence of said machining fluid with a fixed amount of stock removed from said workpiece per discharge, said control means being adapted to act on said power supply for varying the number of said discharges to remove corresponding computed amounts of material from said conductive workpiece.

2. The machine defined in claim 1 wherein said power supply is an electrical discharge machining power supply for passing said machining current in the form of a succession of electrical pulses and includes means for setting the peak current and the duration of electrical discharges resulting at said gap from said electrical pulses, said control means including means for establishing the number of electrical machining discharges to be effected for each of said regions in conjunction with a respective one of said computed amounts.

* * * * *